Aug. 13, 1968     R. GALE     3,396,869
DISPENSING APPARATUS WITH MOVABLE SUPPLY SOURCES
Filed June 9, 1967     2 Sheets-Sheet 1
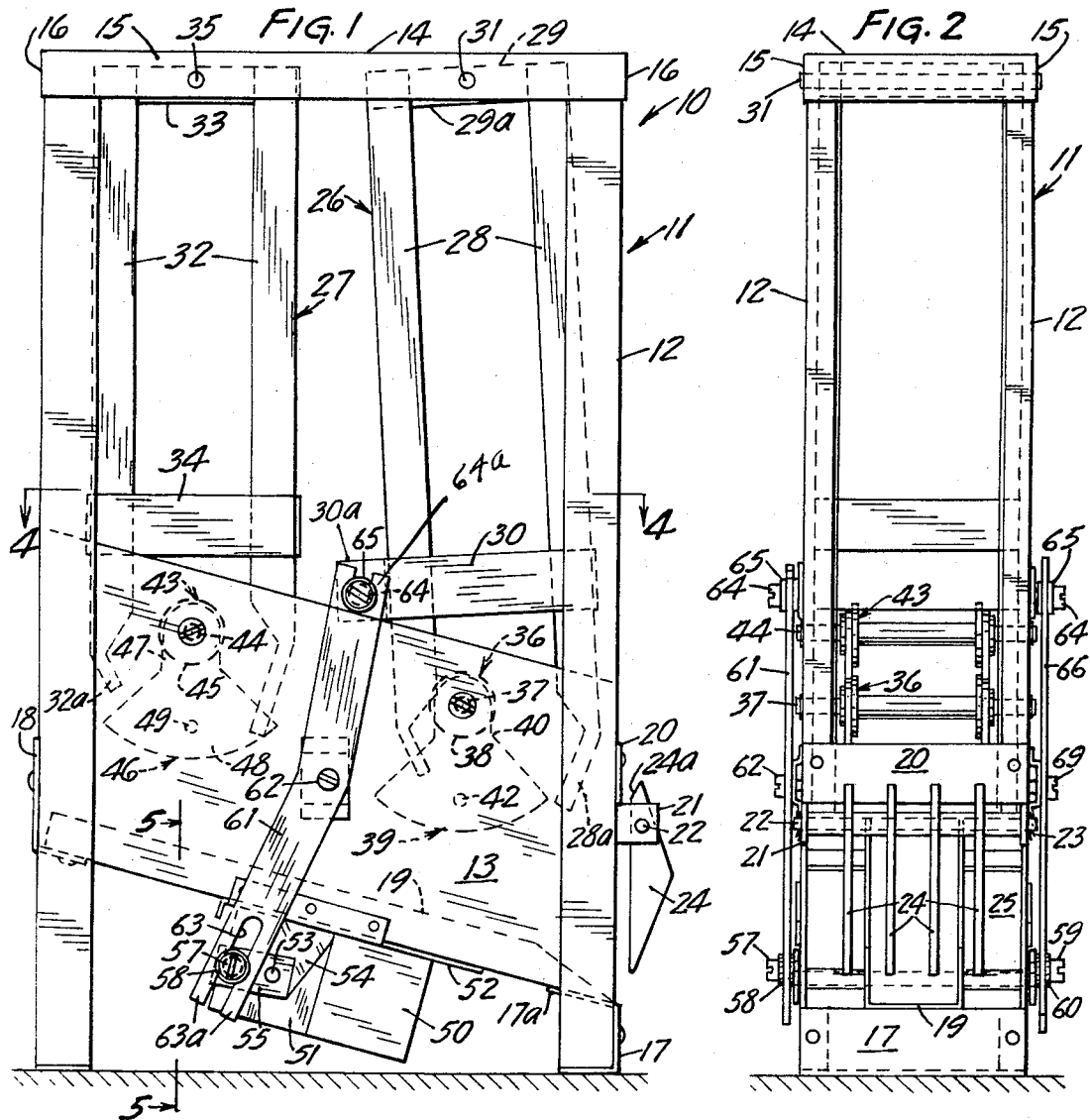
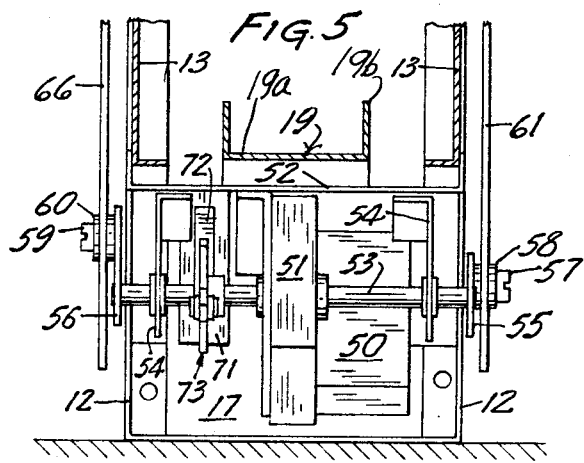
INVENTOR
RONALD GALE
BY Williamson, Palmatier & Bains
ATTORNEYS Aug. 13, 1968  R. GALE  3,396,869
DISPENSING APPARATUS WITH MOVABLE SUPPLY SOURCES
Filed June 9, 1967  2 Sheets-Sheet 2
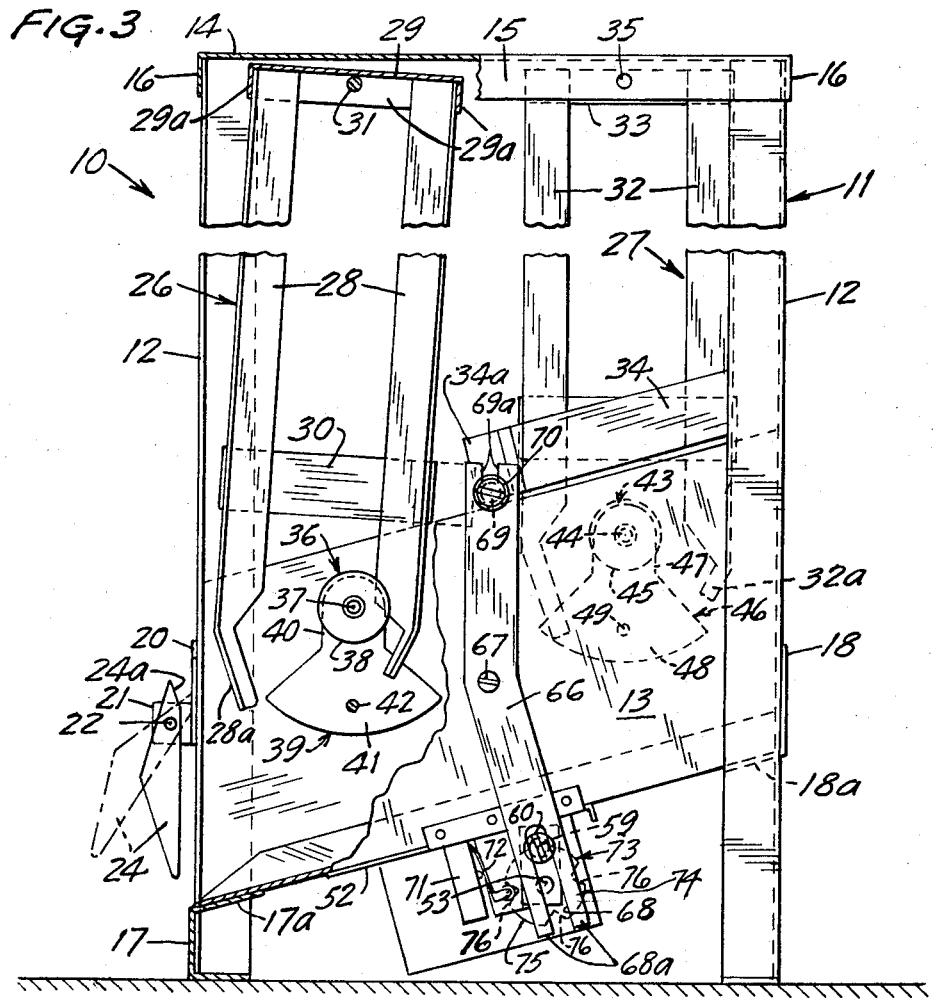
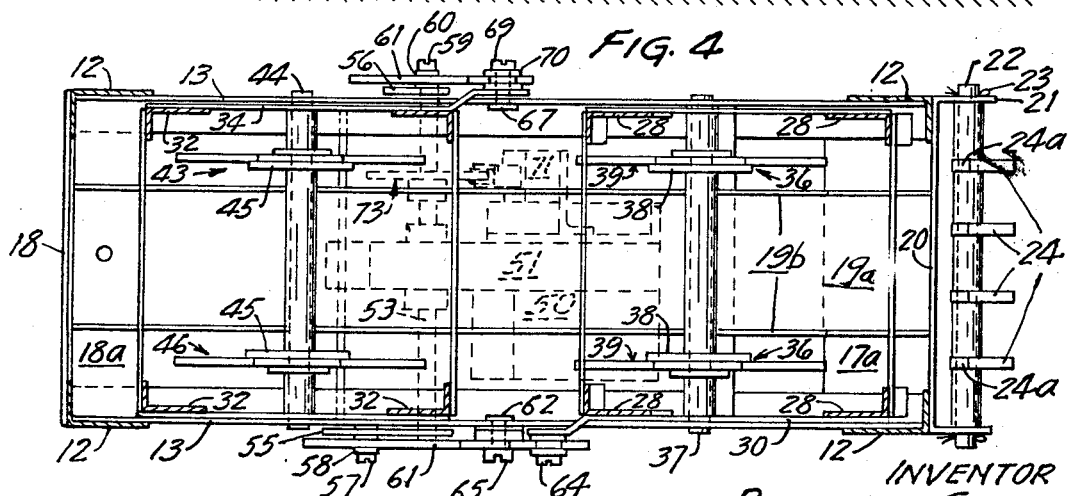
INVENTOR
RONALD GALE
BY Williamson Palmatier & Bains
ATTORNEYS 3,396,869
DISPENSING APPARATUS WITH MOVABLE
SUPPLY SOURCES
Ronald Gale, Hot Springs, Ark., assignor to Norris Dispensers, Inc., Minneapolis, Minn., a corporation of Minnesota
Filed June 9, 1967, Ser. No. 644,892
8 Claims. (Cl. 221—116)

ABSTRACT OF THE DISCLOSURE

An apparatus for dispensing containers comprising a pair of article supporting racks pivotally mounted in a housing and each rack containing a plurality of the containers. An electric motor connected to the racks to shift the racks simultaneously, so that a container may be discharged from one rack when the motor is energized, and the control switch de-energizing the motor after a container has been dispensed.

---

This invention relates to a dispensing apparatus for use in dispensing articles, such as containers and the like.

An object of this invention is to provide a novel dispensing apparatus for dispensing articles, such as containers including cans, bottles, cartons and the like, in which the articles are positioned in a pair of racks, which are simultaneously shiftable during a cycle of operation of the apparatus so that one rack is moved to a position to release an article and the other rack is moved to a nondispensing position, thus permitting a positive but controlled release of a single article.

Another object of this invention is to provide a novel dispensing apparatus in which the articles to be dispensed, such as containers and the like, are positioned in staggered relation within each of a pair of similar vertically suspended dispensing racks so that the weight of the containers in each rack is directed downwardly upon the lowermost container, with article impeding means provided for each rack which prevents escape of the articles from the racks when the latter are in a neutral position, but permitting discharge of the articles therefrom when the racks are in a release position, and suitable electric motor means for simultaneously shifting the racks so that one rack is in a release position and the other rack is in a non-release or neutral position.

These and other objects and advantages of this invention will more fully appear from the following description made in connection with the accompanying drawings wherein like reference characters refer to the same or similar parts throughout the several views, and in which:

FIG. 1 is a side elevational view of one side of the dispensing apparatus;

FIG. 2 is an end view thereof;

FIG. 3 is a view similar to FIG. 1 but illustrating the other side of the apparatus;

FIG. 4 is the plan view thereof; and

FIG. 5 is a cross-sectional view taken approximately along line 5—5 and looking in the direction of the arrows.

Referring now to the drawing, it will be seen that one embodiment of the dispensing apparatus designated in its entirety by the reference numeral 10 is there shown. The dispensing apparatus 10 includes a supporting frame or housing 11 which, as seen, is of generally rectangular configuration. The housing 11 is comprised of vertical frame elements 12 which are rigidly interconnected adjacent their lower ends by suitable side plates 13 which extend longitudinally between the vertical frame elements 12. A top plate 14 of substantially flat construction and having downturned longitudinal flanges 15 and downturned transverse flanges 16 is rigidly secured to the upper ends of the vertical frame elements 12. A front transverse frame element 17 extends between and rigidly interconnects the forwardmost pair of vertical frame members 12 adjacent their respective lower ends, and a rear transverse frame element 18 extends between and rigidly interconnects the rearmost pair of vertical frames. The various elements comprising the frame or housing will be normally oriented in vertical relation during use. To this end, it is pointed out that the dispensing apparatus 10 is adapted for use in dispensing articles preferably containers such as cans, bottles, cartons and the like. Since the contents of many of the containers will be beverages which require refrigeration, the dispensing apparatus 10 will preferably be mounted within a refrigerated cabinet of the type which is coin-operated.

It will be noted that the front transverse frame element 17 has a flange 17a integrally formed therewith and extending integrally therefrom. Similarly, the rear transverse frame element 18 has a flange 18a integrally formed therewith and extending forwardly therefrom. It will be noted that the transverse frame element is disposed at slightly different elevations, the front transverse frame element 17 being disposed at a slightly lower level than the rear transverse frame element 18. An elongate longitudinally guideway member 19 of generally channel-shaped configuration extends between and is secured to the flanges 17a and 18a. It will be noted, that the guideway member 19 is disposed in inclined relation and generally slopes downwardly from rear to front. To this end, it is pointed out that the dispensing apparatus 10 will be oriented so that the front transverse frame element 17 will be disposed forwardly. The guideway member includes a web portion 19a and upstanding flanges 19b.

A generally rectangular substantially flat attachment plate or bracket 20 extends between and is rigidly secured to the forwardmost vertical frame elements 12 and is positioned above the front transverse frame elements 17. Attachment plate 20 has a pair of attachment ears 21 integrally formed with the side edges thereof and which project forwardly therefrom. These ears 21 are suitably apertured and receive the ends of a shaft 22 therethrough. Suitable cotter keys 23 are provided and extend through apertures in the ends of the shaft 22 to secure the same against longitudinal movement with respect to the ears 21. The plurality of similar fingers 24 of elongate generally flat construction have apertures through the upper end portion thereof through which the shaft 22 extends. Thus, the fingers 24 are loosely suspended from the shaft 22 for swinging movement relative thereto about a substantially horizontal axis. It will be noted that the upper end of each finger 24 has a substantially flat oblique edge surface 24a which is disposed in slightly angulated relation with respect to the vertical rear edge thereof. This oblique edge surface of each finger is adapted to engage the front surface of the attachment plate 20 when each finger 24 is swung in a counterclockwise direction, as viewed in FIG. 1, to thereby limit swinging movement of the finger.

Referring now to FIGS. 2 and 3, it will be seen that front transverse frame element 17 and the attachment plate 20 axially define a discharge outlet 25 for the housing or frame 11 so that the articles to be discharged will roll, slide or otherwise be moved by action of gravity down the inclined guideway member 19 through the discharge outlet 25. It will be noted that the fingers 24 are normally disposed in vertical obstructing relation with respect to the discharge outlet 25 so that an article being dispensed will engage the fingers and will be slowed thereby. These fingers will be urged in a counterclockwise direction as viewed in FIG. 1, and in a clockwise direction as viewed in FIG. 3, so that the oblique edge 24a will engage the front surface of the attachment plate 20. It will be noted that when the fingers 24 are swung outwardly by an article to be dispensed as viewed in the dotted line configuration of FIG. 3, the opening defined between the rear edge surface of the fingers 24 and the guideway member 19 is only slightly larger than the article being dispensed so that the fingers tend to slow the movement of the article as it passes through the discharge outlet 25.

The frame or housing 11 has a pair of article dispensing racks mounted therein including a front dispensing rack 26 and a rear dispensing rack 27. These racks are positioned interiorly of the housing 11 and each is of generally rectangular configuration. It will be seen that the front dispensing rack 26 is comprised of a plurality of vertical frame elements 28 which are of angle cross-sectional configuration and which are rigidly interconnected by a substantially rectangular top plate 29 having downturned peripheral flanges 29a. The lower end portions of the vertical frame elements 28 are rigidly interconnected by longitudinal frame elements 30 and suitable transverse frame elements. The lower end portions of the vertical frame elements 28 converge downwardly towards each other as at 28a, as best seen in FIGS. 1 and 3. The flanges of the top plate 29 are apertured to receive a shaft 31 therethrough, the shaft 31 also passing through registering openings and the downturned longitudinal flanges 15 of the top plate 14. Thus, the rack 26 is mounted for fore- and aft-swinging movement about a substantially horizontal axis which extends transversely of the housing 11.

The rear dispensing rack 27 is comprised of vertical frame elements 32 which are also of angle cross-sectional configuration and which are rigidly secured together at their upper ends by top plate 33, the latter having downturned peripheral flanges. The lower end portions of the vertical frame elements 32 are rigidly interconnected by longitudinal frame elements 34 and transverse frame elements. The lower end portions of the vertical frame elements 32 also converge downwardly toward each other as at 32a.

The downturned flanges of the top plate 33 are apertured and these apertures are disposed in registering relation with apertures in the downturned longitudinal flanges 15 of the top plate 14 to receive a shaft 35 therethrough. Thus, the rear dispensing rack 27 is shiftably suspended within the housing 11 for fore- and aft-swinging movement about a horizontal transverse axis. It will be noted that the lower end portions of the racks 26 and 27 are open and are positioned above the guideway member 19. It will also be noted that the front rack 26 has a greater height dimension than the rear dispensing rack 27 and its lower end is disposed at a lower level than the lower end of the rear dispensing rack 27. In the embodiment shown, the dispensing racks 26 and 27 are adapted to contain a plurality of articles, which articles are preferably arranged in vertically staggered relation so that the weight of the stacked articles will be directed downwardly upon the lowermost article. With this arrangement, controlled discharge of a single article from each rack may be obtained in a manner to be described hereinbelow.

To this end, it is pointed out that the racks 26 and 27 are swingable in either direction from a neutral or nonrelease position to two different release positions, so that an article may be discharged from each rack. When the racks are in the neutral or nonrelease position, the racks will be disposed substantially vertically within the housing in the manner of rack 27 as viewed in FIG. 1. Similarly, when the racks are in a release position, the racks will be disposed in oblique or angulated relation with respect to the housing in the manner of front dispensing rack 26 as viewed in FIG. 1.

Means are provided for retaining the articles within each rack when the racks are in the neutral or nonrelease positions and permitting controlled single article discharge when the racks are in one of the two release positions. This means includes a front article impeding mechanism 36, comprised of a shaft 37, which extends between and is journalled in the side plates 13 of the housing 11. The shaft 37 has a pair of similar discs 38 secured thereto, which are axially spaced apart from each other. These discs 38 extend radially outwardly from the shaft 37 and have a substantially larger diameter than the diameter of the shaft 37. It will be noted, that the shaft 37 is positioned between the lowermost ends of the vertical frame elements 28.

It is pointed out, that when the rack 26 is in the neutral position, the discs 38 will impede or obstruct discharge of the articles from the open lower end of the rack. However, when the rack 28 is swung either forwardly or rearwardly to one of the two release positions, the clearance between the circumferential surface of the discs 38 and one of the frame elements 28 is sufficient to allow a single article to be dispensed therefrom.

The article impeding mechanism 36 also has means thereon for retarding or slowing down discharge of each article from the rack 26, when the rack is in the release position, and includes a pair of retarding members of generally flat, metallic construction, which are pivotally suspended from the shaft 37. Each article retarding member includes a neck portion 40, which is apertured to receive the shaft 37 therethrough and is connected to a fan shape portion 41, which flares outwardly from the neck portion 40. It will be noted, that the neck portion 40 has a fore and aft dimension corresponding to or slightly less than the diameter of the discs 38. The article retarding members 39 are rigidly interconnected by a transverse rod 42 which extends between the fan portions of these members.

The rear dispensing rack 27 is also provided with an article impeding mechanism 43 comprised of a shaft 44 which is journalled for rotation in the side plates 13 and which has a pair of discs 45 secured thereto. The discs 45 are of a size to prevent discharge of any of the articles from the rear dispensing rack 27 when the latter is in the neutral or nonrelease positions, but cooperates with the lower end portion of the rack when the latter is in one of the two release positions to permit discharge of the articles therefrom in the manner of the article impeding mechanism 36.

A pair of article retarding members 46 are also swingably mounted upon the shaft 44 and each is comprised of an apertured neck portion 47 through which the shaft 44 projects and a pair of fan portions 48. The fan portions are rigidly interconnected by rod 49. Thus, it will be seen that the article retarding member 46 are constructed in a similar manner to the article retarding members 39. To this end, it is pointed out that when a rack is in a release position, a single article will escape through the lower end thereof and will engage the article retarding members which will be swung out of obstructing relation by the weight of the article. However, the effort required to move the article retarding members does serve to retard or slow down the fall of the article.

Means are provided for shifting the racks 26 and 27 between neutral or nonrelease and release positions. This means includes an electric motor 50, which is drivingly connected to a gear reduction mechanism 51. It will be noted, that the electric motor housing and the housing of the gear reduction mechanism 51 are rigidly secured to an attachment bracket 52, which is affixed to the inturned flanges at the lower edges of the side plates 13. It will further be noted, that the electric motor and gear reduction mechanism are positioned below the guideway member 19 and, in the embodiments shown, are located substantially centrally of the housing 11 but adjacent the lower end portion thereof.

The gear reduction mechanism 51 has an output shaft 53, which projects from opposite sides thereof, the shaft extending through suitable bearing plates 54, which are rigidly secured to and depend from the attachment plate 52. One end of the output shaft 53 has a crank arm 55 secured thereto for rotation therewith, while the other end of the shaft has a crank arm 56 secured thereto for rotation therewith. It will be noted, that the crank arms 55 and 56 are disposed at substantially right angles with respect to each other, so that one crank arm is arranged 90° out of phase with respect to the other crank arm. Crank arm 55 has a small shaft or axle 57 journalled therein, and a grooved cam roller 58 is revolvably mounted on shaft 57. Similarly, crank arm 56 has a small shaft or axle 59 journalled in one end thereof, on which is revolvably mounted a grooved cam roller 60.

This crank arm and cam roller arrangement, on each end of the output shaft 53, constitutes part of the drive linkage between the electric motor and the dispensing racks. This drive linkage also includes an elongate drive lever 61 which is journalled on a pivot pin 62 intermediate its ends, the pivot pin 62 being secured to one of the side plates 13 and projecting outwardly therefrom. The drive lever 61 has an elongate slot 63 in the lower end portion thereof to define a pair of legs 63a which engage the grooved roller 58. Thus, when the crank arm 55 is revolved, the roller 58 will oscillate lever 61 about its pivot 62.

The upper end of the drive lever 61 also has a slot 64 therein which defines a pair of legs 64a. One of the longitudinal frame elements 30 of the front dispensing rack 26 has a rearwardly projecting extension thereon which is outwardly offset as at 30a, and which has a shaft 65 journalled therein on which is revolvably mounted a grooved roller 65. It will be seen that the inner surfaces of the leg 63a engage the grooved roller 65 so that swinging movement of the drive lever 65 will be transmitted through the roller 65 to the front rack 26 to oscillate the same between neutral and release positions.

Referring now to FIG. 3, it will be seen that a second generally vertically oriented drive lever 66 is provided and is swingably mounted intermediate its ends on a pivot pin 67 which is secured to one of the side plates 13 and projects outwardly therefrom. The drive levers 61 and 66 are disposed at opposite sides of the housing 11. This drive lever 66 has a slot 68 in the lower end thereof which defines a pair of legs 68a that engage the grooved roller 60. Thus, when the crank arm 56 is revolved, the lever 66 will be oscillated about its pivot 67 in a fore and aft direction.

The upper end of the lever 66 has a slot 69 therein, which defines a pair of legs 69a. One of the longitudinal frame elements 34 of the rear dispensing rack 27, has a forwardly projecting extension 34a, which is offset laterally so that it is positioned exteriorly of the adjacent side plate 13. This rearwardly projecting extension 34a has a shaft 69 journalled therein on which is revolvably mounted a grooved cam roller 70. The grooved cam roller 70 is engaged by the legs 68a of the drive lever 66, so that when the drive lever is oscillated, the rear dispensing rack 27 will be swung about its pivotal mounting between release and neutral positions. It will be noted, that drive lever 61 and drive lever 66 are of substantially similar angulated construction, and when the motor 50 is energized, both of the racks will be shifted simultaneously.

Means are provided for energizing the motor 50, and this means may comprise a coin-actuated switch of a kind well-known in the art. When the coin-actuated switch is momentarily closed by the insertion of coins into the apparatus, the motor will be energized to simultaneously move both dispensing racks through a portion of a complete cycle.

Means are provided so that the crank arms 55 and 56 will be driven through an arc of approximately 90° when the motor 50 is energized. The means for de-energizing the circuit to the electric motor includes a normally closed relay blocking microswitch 71 having a switch arm 72, which is urged to the open position when the motor is originally energized, and which is held in the closed position until the shaft 53 is revolved through an arc of approximately 90°. The means for operating or actuating the switch arm 72 comprises a revolvable operator member 73 having four operator arms 74 each having an arcuate outer camming edge 75. Each adjacent arm has a recess 76 therebetween. When the motor 50 is energized by the insertion of a coin, the shaft 53 will be revolved thus revolving the operator member 73. The switch arm 72 will be moved to the closed position by engagement of one of the arms 74 thus holding the motor 50 in energized condition until the camming edge of the associated arm has been moved out of engaging relation with the switch arm thus permitting the switch arm to be seated in the next adjacent recess 76. When this occurs, the motor will be de-energized.

During operation of the apparatus, each dispensing rack 26 and 27 will have a plurality of articles to be dispensed, positioned therein. In the embodiments shown, the dispensing racks are arranged and constructed to accommodate a plurality of beverage containing cans therein so that the cans are disposed transversely in each rack and are arranged in vertically staggered relation. In other words, when a plurality of cans are positioned in one of the dispensing racks, the fore and aft dimension of each rack will not be great enough to permit adjacent cans to be positioned in side-by-side relation unless one can is disposed at a slightly higher elevation than the adjacent can.

After the dispensing racks 26 and 27 have been loaded, it will be assumed that the racks are disposed in the position illustrated in FIG. 1. When in this position, the front dispensing rack 26 will have been moved to a front release position and the article, such as a can, will have been discharged from the opening defined between the discs 38 and the forwardmost vertical frame elements 28. The next can to be dispensed from the front dispensing rack 26 will be disposed lowermost with respect to the staggered cans in the front dispensing rack 26, and will be positioned closely adjacent the rear vertical frame elements 28 thereof. The discs 38 will prevent escape of the cans from the open lower end of the front dispensing rack.

When the motor 50 is energized again, the front dispensing rack will be moved rearwardly from its forward release position, as viewed in FIG. 1, to a neutral position, while the rear dispensing rack 27 will be moved rearwardly from the neutral position to its rearward release position. The lowermost article to be next dispensed from the rear dispensing rack will be positioned against the rear vertical frame element 32 and will engage the discs 38. However, when the motor 50 is energized, the shaft 53 will be revolved, thus simultaneously revolving crank arms 55 and 56, which in turn, drive the drive levers 61 and 66. The drive levers will be swung about their respective central pivots, to move the front dispensing rack 26 from its forward release position in a rearward direction to a neutral position. Simultaneously, the rear dispensing rack will be shifted from its nentral position in a rearward direction, to its rear release position. As the rear dispensing rack reaches its rear dispensing position, the article, such as a can or bottle, will escape downwardly by action of gravity through the open lower end of the dispensing rack, since the rear dispensing rack will have been moved a sufficient distance so that the discs 38 are disposed out of obstructing relation to this lowermost article. The article will engage the article retarding members 39, which produce a counter-balancing effect with respect to the downward movement of the article, and thereby minimize danger of damage to the article being dispensed. The article will fall upon the guideway member 19 and will roll or slide down the guideway member into the opening 25. When the article reaches the opening 25, the fingers 24 will be engaged and will be swung about their respective pivotal suspension, thus again slowing down movement of the article being dispensed. Although not shown in the drawing, the article may be received within a suitable receptacle which is open to the exterior.

The electric motor 50 will have been retained in its energized condition until the shaft 53 will have revolved through an arc of approximately 90°. As the shaft 53 is revolved, one of the camming arms 74 will have engaged the switch arm 72. In the embodiments shown, the switch 71 is a normally closed relay block-out switch, which is opened by one of the cam arms 74 when the motor is energized, and is held in open condition until the switch arm seats within one of the recesses 76. When the block-out relay switch is normally closed, the master relay of the circuitry will be conditioned for a cycle of operation, whereby when the switch 71 is opened and again closed, the circuit to the motor 50 will be opened and the master relay will again be conditioned for the next cycle.

The rear dispensing rack will be in the rearward dispensing position when the motor 50 is de-energized, while the front dispensing rack 26 will be in a neutral position. Since the articles to be dispensed are in staggered relation, the next article to be dispensed from the rear dispensing rack will be positioned against the forwardmost pair of vertical frame elements 32 and will be prevented from escape from the open lower end of the rack by the discs 38. The article to be dispensed from the front dispensing rack will be positioned adjacent the rearmost portion of the rack adjacent the lower end thereof and will be obstructed against escape from the rack by the discs 38. When the motor 50 is again energized, the rear dispensing rack 27 will be moved from its rear release position to a neutral position, while the front dispensing rack 26 will be moved from a neutral position to its rear release position whereupon an article will escape from the front dispensing rack through the open lower end thereof and will fall upon the guideway member and thereafter move outwardly through the outlet 25. Again, it is pointed out that the free fall of the article from the dispensing rack is retarded by the counter-balance article retarding members 39.

It is pointed out that many kinds of articles may be dispensed from the apparatus 10 including bottles, cans, cartons and preferably other kinds of containers. A plurality of the dispensing apparatus may be disposed within a single cabinet and the dispensing racks of each unit may contain different kinds of articles, such as different beverages. Suitable selector switches may be interposed between the coin switch so that a purchaser may be provided with a relatively large selection from which to choose.

From the foregoing, it will be seen that the dispensing apparatus permits positive but controlled release of an article when the apparatus is operated. By utilizing separate dispensing racks, one of the racks will be in condition for release each time the machine is operated.

Thus, from the foregoing description, it will be seen that I have provided a novel dispensing apparatus which is not only of simple and inexpensive construction and operation, but one which functions in a more efficient manner than any heretofore known device.

It will, of course, be understood that various changes may be made in the form, details, arrangement and proportions of the various parts without departing from the scope of my invention.

What I claim is:

1. Dispensing apparatus for dispensing articles such as containers and the like, said apparatus including a housing having a dispensing outlet and having a guideway communicating with said outlet,
   a pair of similar, spaced apart support racks reciprocably mounted on said housing and being oriented in substantially upright relation, each of said racks having an open lower end positioned above said guideways and each rack being shiftable from a neutral position to a first release position, then returned to the neutral position and shifted in the return direction to a second release position,
   each of said racks being arranged and constructed to contain therein a plurality of the articles to be dispensed, the articles being vertically arranged in staggered relation within each rack so that one article only may be discharged from the lower end of each rack,
   a pair of article impeding structures on said housing each being disposed in obstructing relation to the open lower end of one of the racks when the latter is in the neutral position,
   power means on said frame,
   actuating means interrelated with said power means for energizing the same,
   drive mechanism interconnecting said power means with said racks whereby when said power means is energized, one of said racks will be shifted to one of said release positions and the other of said racks will be shifted to the neutral position,
   control means disposed in controlling relation with said power means and being operable to de-energize the power means after one of the racks is shifted from a release to a neutral position and the other rack is shifted from the neutral to the release position.

2. The dispensing apparatus as defined in claim 1 wherein each of said racks is pivotally connected adjacent its upper end to said housing for swinging movement about a substantially horizontal axis.

3. The dispensing apparatus as defined in claim 1 wherein said drive mechanism includes a first linkage interconnecting one of said racks with said power means, and a second linkage interconnecting the other of said racks with said power means.

4. The dispensing apparatus as defined in claim 3 wherein each of said linkages includes a motion transmitting cam lever pivotally mounted on said housing, a cam element interconnected with said power means engaging one end of the lever for producing movement thereof, and a cam follow element on the associated rack engaging the other end of the lever to be moved thereby.

5. The dispensing apparatus as defined in claim 1 wherein each of said article impeding structures includes a shaft mounted on said housing, and disc means mounted on said shaft and disposed in obstructing relation with respect to the open lower end of the rack when the latter is in the neutral position for permitting escape of the articles from the rack when the latter is in a release position.

6. The dispensing apparatus as defined in claim 1 wherein said guideway is inclined towards said outlet of the housing.

7. A dispensing apparatus as defined in claim 1 wherein said control means comprises a switch having a switch operating arm, and a rotary cam drivingly connected with said power means and being revolved thereby to operate the switch arm.

8. A dispensing apparatus as defined in claim 1 and a pair of counterweight members each mounted on one of said article impeding shafts and each serving to engage an article dispensed through the open lower end of the associated rack to slow the movement of the article being dispensed as it falls by gravity upon said guideway.

References Cited

UNITED STATES PATENTS

| | | | |
|---|---|---|---|
| 918,886 | 4/1909 | Mills | 221—116 |
| 3,158,247 | 11/1964 | Gale | 221—116 X |
| 3,341,069 | 9/1967 | Newberry | 221—116 |

STANLEY H. TOLLBERG, *Primary Examiner.*